(12) United States Patent  
Okubo et al.

(10) Patent No.: US 8,180,189 B2
(45) Date of Patent: May 15, 2012

(54) OPTICAL MODULE AND OPTICAL WAVEGUIDE

(75) Inventors: Miwa Okubo, Kanagawa (JP); Takahiro Arakida, Kanagawa (JP); Hidehiko Nakata, Kanagawa (JP); Terukazu Naruse, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/320,554

(22) Filed: Jan. 29, 2009

(65) Prior Publication Data

US 2009/0214157 A1  Aug. 27, 2009

(30) Foreign Application Priority Data

Feb. 21, 2008  (JP) .................................. 2008-040199

(51) Int. Cl.
*G02B 6/30* (2006.01)
*G02B 6/36* (2006.01)
(52) U.S. Cl. .......................................... 385/49; 385/83
(58) Field of Classification Search .................... 385/49, 385/83
See application file for complete search history.

(56) References Cited

U.S. PATENT DOCUMENTS

| 5,481,632 A * | 1/1996 | Hirai et al. ....................... 385/49 |
| 2006/0140546 A1 | 6/2006 | Nakata et al. |
| 2007/0154145 A1* | 7/2007 | Miyadera et al. ................ 385/49 |

FOREIGN PATENT DOCUMENTS

| JP | 02-211406 | 8/1990 |
| JP | 2006-184754 | 7/2006 |
| JP | 2006-209068 | 8/2006 |
| JP | 2006-229068 | 8/2006 |
| JP | 2007-025382 | 2/2007 |
| JP | 2007-072007 | 3/2007 |
| JP | 2007-178790 A | 7/2007 |
| JP | 2007-178852 | 7/2007 |

OTHER PUBLICATIONS

Japanese Office Action issued May 12, 2010 for corresponding Japanese Application No. 2008-040199.

* cited by examiner

*Primary Examiner* — Jerry Rahll
(74) *Attorney, Agent, or Firm* — Rader Fishman & Grauer, PLLC

(57) ABSTRACT

An optical module includes an optical waveguide including a plurality of waveguide cores through which light propagates, a clad configured to trap the light in the waveguide cores, a plurality of fiber guide grooves in which optical fibers are inserted, the fiber guide grooves being arranged in parallel, and an adhesive spread groove configured to connect the fiber guide grooves and provided at leading ends of the fiber guide grooves with which the optical fibers contact; and a fixing member fixed to the optical waveguide with an adhesive while covering the fiber guide grooves. The fiber guide grooves have side walls including support projections configured to support, align, and optical couple the optical fibers to the waveguide cores, and adhesive recesses configured to define gaps between outer peripheral surfaces of the optical fibers and the fiber guide grooves so that the adhesive spreads in the gaps.

11 Claims, 14 Drawing Sheets

OPTICAL MODULE AND OPTICAL WAVEGUIDE

CROSS REFERENCES TO RELATED APPLICATIONS

The present invention contains subject matter related to Japanese Patent Application JP 2008-040199 filed in the Japanese Patent Office on Feb. 21, 2008, the entire contents of which are incorporated herein by reference.

BACKGROUND OF THE INVENTION

1. Field of the Invention

The present invention relates to an optical waveguide having fiber guide grooves in which optical fibers are inserted, and to an optical module including the optical waveguide. More particularly, the present invention relates to an improvement in spreadability of adhesive with which optical fibers are fixed to an optical waveguide.

2. Description of the Related Art

Information transmission has hitherto been performed between boards and between chips in electronic apparatuses by means of electric signals. In order to realize information transmission with a larger capacity at a higher speed, optical interconnection techniques have attracted attention. As one optical interconnection technique, an optical module of a waveguide type using a planar optical waveguide has been proposed.

Japanese Patent No. 2893093 proposes an optical module of such a waveguide type. In this optical module, a planer optical waveguide is provided on a silicon substrate, and the silicon substrate has a fiber guide groove in which an optical fiber is inserted so as to be optically coupled to the optical waveguide.

In contrast, Japanese Unexamined Patent Application Publication No. 2007-178852 proposes an optical waveguide formed of a polymeric material and including fiber guide grooves. This structure is less expensive than the above-described structure in which the fiber guide groove is provided in the silicon substrate.

For example, such an optical waveguide formed of a polymeric material is mounted together with an optical element on a silicon substrate so as to constitute an optical module.

When a sudden thermal shock is given to the optical module including the optical waveguide formed of a polymeric material, the optical waveguide and the optical element are misaligned and the optical waveguide is cracked because the optical waveguide formed of an organic material and the silicon substrate formed of an inorganic metal have different coefficients of thermal expansion.

Accordingly, in a technique disclosed in Japanese Unexamined Patent Application Publication No. 2007-072007, an optical waveguide formed of a polymeric material and optical fibers inserted in fiber guide grooves provided in the optical waveguide can be fixed together by a fixing member formed of a transparent inorganic material, such as glass, which has a low coefficient of thermal expansion and a high heat resistance.

SUMMARY OF THE INVENTION

In optical modules of the related art, deformation and cracks of the optical waveguide during use can be minimized by fixing the optical fibers inserted in the fiber guide grooves and the optical waveguide together by the fixing member.

On the other hand, by fixing the optical fibers inserted in the fiber guide grooves to the optical waveguide with a photosensitive adhesive, heat is prevented from being applied to the optical waveguide. In other words, an adhesive is spread through the fiber guide grooves in a state in which the optical fibers are pressed by the fixing member, and is cured by light irradiation, thereby fixing the optical fibers to the optical waveguide.

Unfortunately, when the adhesive spreads, bubbles enter the adhesive at the leading ends of the optical fibers inserted in the fiber guide grooves. If the adhesive containing the bubbles is cured, the loss increases at optical coupling portions between the optical fibers and the optical waveguide.

Further, when the number of fiber guide grooves increases, more time is taken until the adhesive spreads. If the adhesive insufficiently spreads into the fiber guide grooves, the adhesive strength of the optical fibers decreases. When much time is taken for spreading, the working efficiency decreases.

Accordingly, it is desirable to provide an optical waveguide and an optical module that enhance spreadability of an adhesive for fixing optical fibers to the optical waveguide.

An optical module according to an embodiment of the present invention includes an optical waveguide including a plurality of waveguide cores through which light propagates, a clad configured to trap the light in the waveguide cores, a plurality of fiber guide grooves in which optical fibers to be optically coupled to the waveguide cores are inserted, the fiber guide grooves being arranged in parallel, and an adhesive spread groove extending in a direction intersecting the fiber guide grooves and configured to connect the fiber guide grooves arranged in parallel, the adhesive spread groove being provided at leading ends of the fiber guide grooves with which the optical fibers contact; and a fixing member fixed to the optical waveguide with an adhesive while covering the fiber guide grooves in which the optical fibers are inserted. The fiber guide grooves have side walls including support projections configured to support the optical fibers inserted in the fiber guide grooves and to align and optically couple the optical fibers to the waveguide cores, and adhesive recesses configured to define gaps between outer peripheral surfaces of the optical fibers and the fiber guide grooves so that the adhesive spreads in the gaps.

In this optical module, the optical fibers inserted in the fiber guide grooves of the optical waveguide are brought into contact with the leading ends of the fiber guide grooves from which end faces of the waveguide cores are exposed, and are pressed against the fiber guide grooves by the fixing member. Hence, the outer peripheral surfaces of the optical fibers are supported in the fiber guide grooves by the support projections, and the radial positions of the optical fibers are regulated.

The optical fibers inserted in the fiber guide grooves and pressed by the fixing member are fixed to the optical waveguide with the adhesive spreading into the fiber guide grooves from between the fixing member and the optical waveguide.

The adhesive spreading in the fiber guide grooves from between the fixing member and the optical waveguide flows through the adhesive spread groove between the adjacent fiber guide grooves, and spreads into the fiber guide grooves in a short time.

Bubbles are prevented from entering the adhesive spreading between the leading ends of the optical fibers inserted in the fiber guide grooves and the leading ends of the fiber guide grooves from which the end faces of the waveguide cores are exposed.

Further, the adhesive flows between the outer peripheral surfaces of the optical fibers inserted in the fiber guide grooves and the adhesive recesses of the fiber guide grooves, and spreads toward bottom faces of the fiber guide grooves.

An optical module according to another embodiment of the present invention includes an optical waveguide including a plurality of waveguide cores through which light propagates, a clad configured to trap the light in the waveguide cores, a plurality of fiber guide grooves in which optical fibers to be optically coupled to the waveguide cores are inserted, the fiber guide grooves being arranged in parallel, and an adhesive spread groove extending in a direction intersecting the fiber guide grooves and configured to connect the fiber guide grooves arranged in parallel, the adhesive spread groove being provided at leading ends of the fiber guide grooves with which the optical fibers contact; and a fixing member fixed to the optical waveguide with an adhesive while covering the fiber guide grooves in which the optical fibers are inserted. The fiber guide grooves support the optical fibers by side walls formed of a core material that forms the waveguide cores or a clad material, and align and optically couple the optical fibers to the waveguide cores.

In this optical module, the optical fibers inserted in the fiber guide grooves of the optical waveguide are brought into contact with the leading ends of the fiber guide grooves from which end faces of the waveguide cores are exposed, and are pressed against the fiber guide grooves by the fixing member. Hence, the outer peripheral surfaces of the optical fibers are supported in the fiber guide grooves by the side walls, and the radial positions of the optical fibers are regulated.

The optical fibers inserted in the fiber guide grooves of the optical waveguide and pressed by the fixing member are fixed to the optical waveguide with the adhesive spreading in the fiber guide grooves from between the fixing member and the optical waveguide.

The adhesive spreading in the fiber guide grooves from between the fixing member and the optical waveguide flows through the adhesive spread groove between the adjacent fiber guide grooves, and spreads into the fiber guide grooves in a short time.

Bubbles are prevented from entering the adhesive spreading between the leading ends of the optical fibers inserted in the fiber guide grooves and the leading ends of the fiber guide grooves from which the end faces of the waveguide cores are exposed.

An optical waveguide according to a further embodiment of the present invention includes a plurality of waveguide cores through which light propagates; a clad configured to trap the light in the waveguide cores; a plurality of fiber guide grooves in which optical fibers to be optically coupled to the waveguide cores are inserted, the fiber guide grooves being arranged in parallel; and an adhesive spread groove extending in a direction intersecting the fiber guide grooves and configured to connect the fiber guide grooves arranged in parallel, the adhesive spread groove being provided at leading ends of the fiber guide grooves with which the optical fibers contact. The fiber guide grooves support the optical fibers by side walls formed of a core material that forms the waveguide cores or a clad material, and align and optically couple the optical fibers to the waveguide cores.

In this optical waveguide, the optical fibers inserted in the fiber guide grooves are brought into contact with the leading ends of the fiber guide grooves from which end faces of the waveguide cores are exposed, and are pressed against the fiber guide grooves by a fixing member. Hence, the outer peripheral surfaces of the optical fibers are supported in the fiber guide grooves by the side walls, and the radial positions of the optical fibers are regulated.

The optical fibers inserted in the fiber guide grooves of the optical waveguide and pressed by the fixing member are fixed to the optical waveguide with the adhesive spreading in the fiber guide grooves from between the fixing member and the optical waveguide.

The adhesive spreading in the fiber guide grooves from between the fixing member and the optical waveguide flows through the adhesive spread groove between the adjacent fiber guide grooves, and spreads into the fiber guide grooves in a short time.

Bubbles are prevented from entering the adhesive spreading between the leading ends of the optical fibers inserted in the fiber guide grooves and the leading ends of the fiber guide grooves from which the end faces of the waveguide cores are exposed.

According to the embodiments of the present invention, it is possible to prevent bubbles from entering between the leading ends of the optical fibers and the fiber guide grooves, and to thereby reduce coupling loss.

Since the adhesive spreads between the fiber guide grooves arranged in parallel through the adhesive spread groove, the time taken for the adhesive to spread can be shortened, and the working efficiency can be enhanced. Moreover, since the adhesive sufficiently spreads into the fiber guide grooves, the adhesive strength of the optical fibers can be increased.

DESCRIPTION OF THE PREFERRED EMBODIMENTS

Optical modules and optical waveguides according to embodiments of the present invention will be described below with reference to the drawings.

Figure 1:
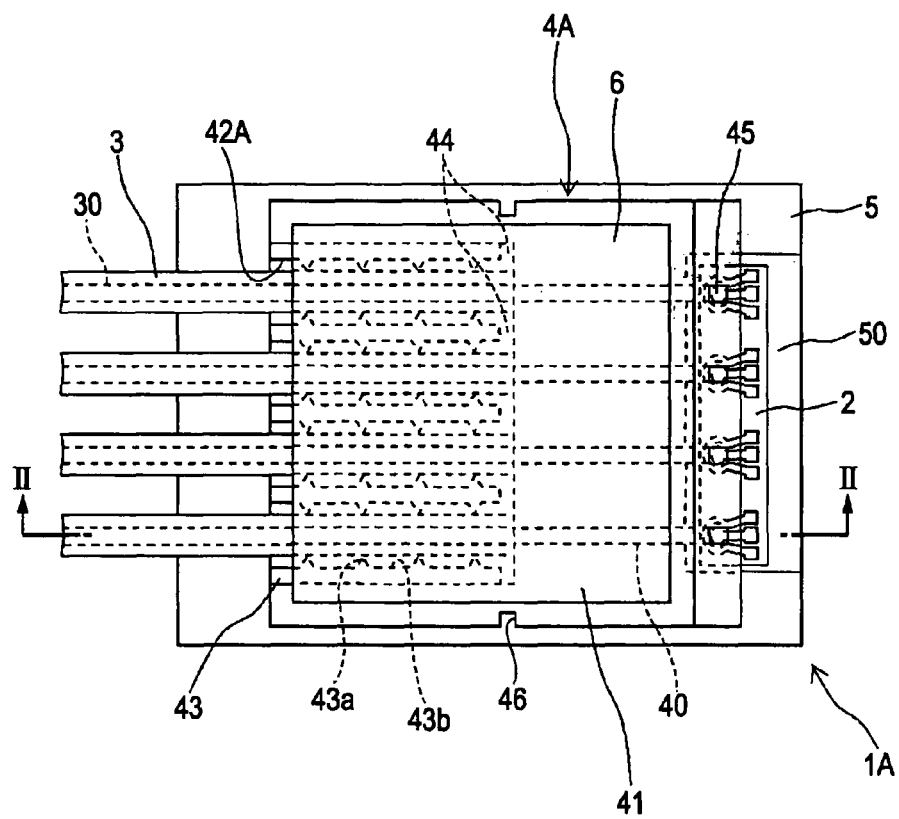
FIG. 1 is a plan view of an optical module according to a first embodiment.
Figure 2:
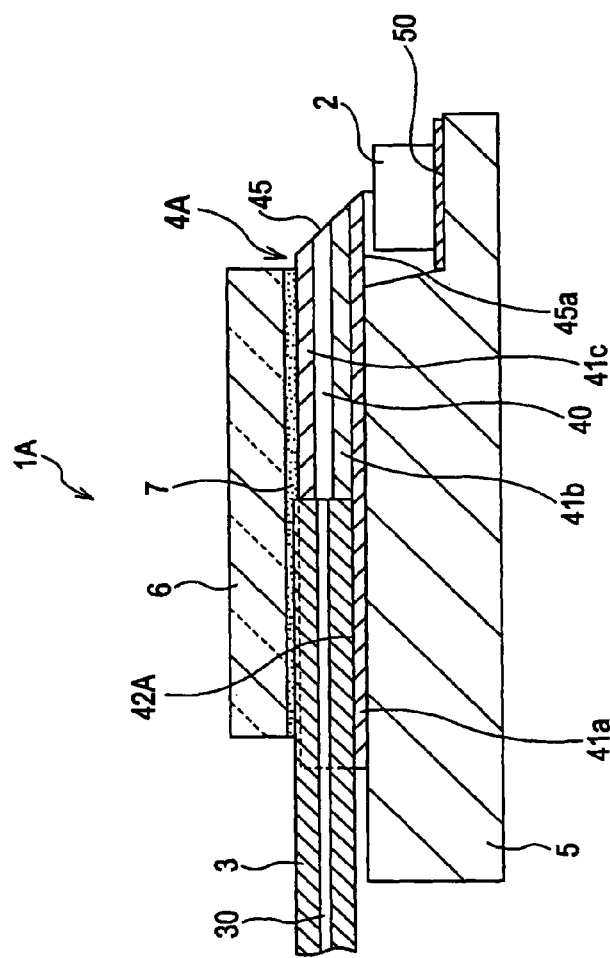
FIG. 2 is a cross-sectional side view of the optical module, taken along line II-II in FIG. 1.
Figure 3:
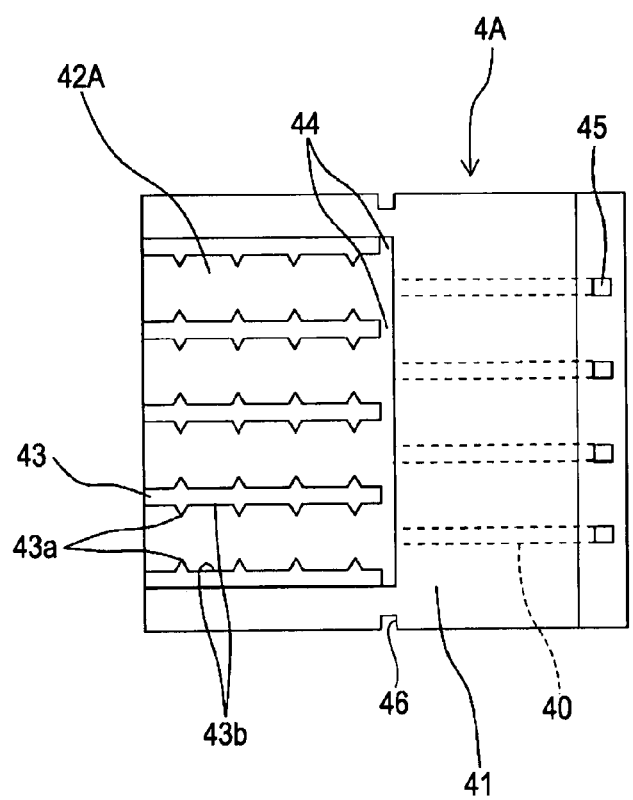
FIG. 3 is a plan view of an optical waveguide according to the first embodiment.
Figure 4:
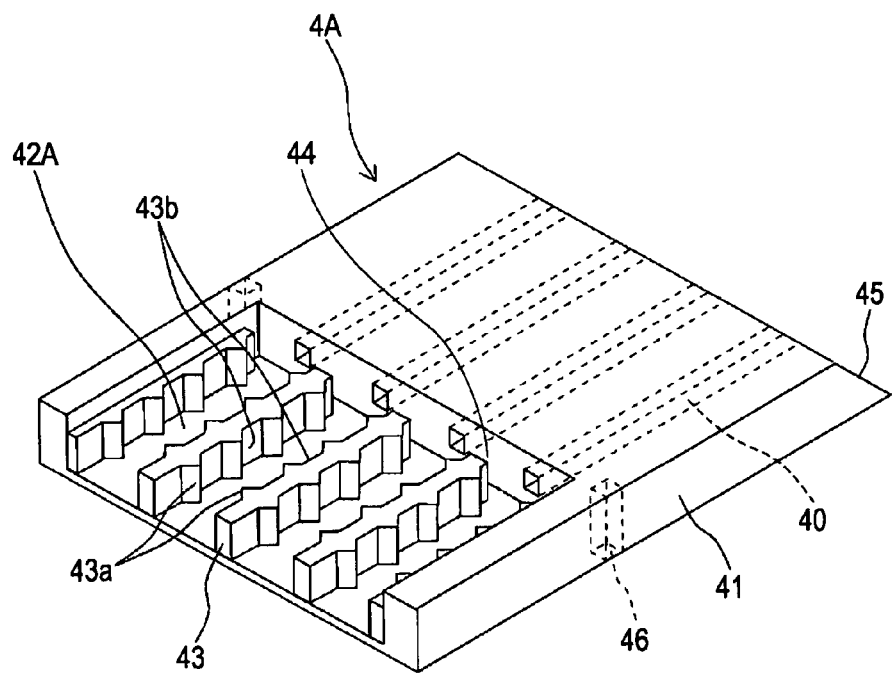
FIG. 4 is a perspective view of the optical waveguide.

Structures Examples of Optical Module and Optical Waveguide According to First Embodiment FIG. 1 is a plan view of an optical module according to a first embodiment, and FIG. 2 is a cross-sectional side view of the optical module, taken along line II-II in FIG. 1. FIG. 3 is a plan view of an optical waveguide according to the first embodiment, and FIG. 4 is a perspective view of the optical waveguide.

An optical module 1A according to the first embodiment includes a surface-type optical element 2 and an optical waveguide 4A. The optical element 2 includes light emitting elements such as surface emitting semiconductor lasers (VCSEL) or light receiving elements such as photodiodes (PD). The optical waveguide 4A connects the optical element 2 to optical fibers 3. The optical element 2 and the optical waveguide 4A are mounted on a mount board 5.

For example, the optical element 2 is a laser array in which a plurality of light emitting elements are arranged in parallel at regular intervals or a photodiode array in which a plurality of light receiving elements are arranged in parallel at regular intervals. In the optical element 2, only light emitting elements or only light receiving elements may be arranged in parallel, or light emitting elements and light receiving elements may be arranged in parallel in combination.

The optical waveguide 4A is formed of a material that transmits light having a predetermined wavelength. The optical waveguide 4A includes a plurality of waveguide cores 40 through which light propagates, and a clad 41 that traps the light in the waveguide cores 40. The waveguide cores 40 and the clad 41 are integrally formed of, for example, a photosensitive acrylic polymeric material in a predetermined shape by a photolithographic process.

In the clad 41 of the optical waveguide 4A, an under clad 41b is provided on a buffer clad 41a, and the waveguide cores 40 are provided on the under clad 41b. The waveguide cores 40 have a refractive index slightly higher than the refractive index of the clad 41. In the first embodiment, four linear waveguide cores 40 are arranged in parallel.

Further, in the clad 41 of the optical waveguide 4A, an over clad 41c is provided on the under clad 41b on which the waveguide cores 40 are provided. Thus, the optical waveguide 4A has a buried structure. Light incident on the waveguide cores 40 propagates while being trapped therein.

In the first embodiment, the core diameter of the waveguide cores 40 is about 40 by 40 µm, the thickness of the buffer clad 41a is about 20 µm, the thickness of the under clad 41b is about 40 µm, and the thickness of a portion of the over clad 41c above the waveguide cores 40 is about 30 µm.

The optical waveguide 4A has, in one end face in the extending direction of the waveguide cores 40, fiber guide grooves 42A in which optical fibers 3 are inserted. The fiber guide grooves 42A are open at the end face of the optical waveguide 4A, and linearly extend from the waveguide cores 40. End faces of the waveguide cores 40 are exposed from a surface provided at the leading ends of the fiber guide grooves 42A and perpendicularly to the waveguide cores 40. Since four waveguide cores 40 are provided in the optical waveguide 4A of the first embodiment, four fiber guide grooves 42A are provided correspondingly to the waveguide cores 40.

Each of the fiber guide grooves 42A has side wall portions 43 including support projections 43a and adhesive recesses 43b. The support projections 43a support, align, and optically couple an optical fiber 3 to the corresponding waveguide core 40. The adhesive recesses 43b define cavities, in which the adhesive spreads, between an outer peripheral surface of the optical fiber 3 and the fiber guide groove 42A.

The support projections 43a project from opposing side wall faces of the fiber guide groove 42A at a plurality of positions along the fiber guide groove 42A. Between the support projections 43a, the adhesive recesses 43b are provided, and the groove width is large at the adhesive recesses 43b.

The diameter of the fiber guide groove 42A is substantially equal to the diameter of the optical fiber 3 at the support projections 43a, and is slightly larger than the diameter of the optical fiber 3 at the adhesive recesses 43b. The depth of the fiber guide groove 42A is slightly smaller than the diameter of the optical fiber 3.

Hence, when the optical fiber 3 is inserted in the fiber guide groove 42A of the optical waveguide 4A, little space is formed between the support projections 43a for supporting the optical fiber 3 and the outer peripheral surface of the optical fiber 3. This restricts the radial movement of the optical fiber 3.

The position of the fiber guide groove 42A and the projecting height of the support projections 43a are set so that the optical axis of the waveguide core 40 of the optical waveguide 4A is aligned with the optical axis of a core 30 of the optical fiber 30 when the optical fiber 3 is inserted in the fiber guide groove 42A.

Therefore, when the optical fiber 3 is inserted in the fiber guide groove 42A, the center position of the core 30 of the optical fiber 3 is adjusted so that the optical axis thereof is aligned with the optical axis of the waveguide core 40, and the optical fiber 3 and the waveguide core 40 are thereby coupled optically. Thus, the optical waveguide 4A and the optical fiber 3 can be connected by passive alignment with a mechanical positioning accuracy.

In the optical waveguide 4A of the first embodiment, the support projections 43a and the adhesive recesses 43b of the side walls 43 in the fiber guide grooves 42A are integrally formed of a core material that forms the waveguide cores 40. When the optical waveguide 4A is produced, the side walls 43 are formed in the same production process as for the waveguide cores 40, and the support projections 43a for supporting the optical fibers 3 are formed with the same accuracy as that for the waveguide cores 40.

Hence, it is possible to increase the accuracy in aligning the optical fibers 3 inserted in the fiber guide grooves 42A with the waveguide cores 40.

The optical waveguide 4A also includes an adhesive spread groove 44 at the leading ends of the fiber guide grooves 42A. The adhesive spread groove 44 extends in a direction intersecting the fiber guide grooves 42A arranged in parallel, and connects the leading ends of the fiber guide grooves 42A. At the leading ends of the fiber guide groves 42A on both sides in the direction in which the fiber guide grooves 42A are arranged, the adhesive spread groove 44 extends to sides opposite the adjacent fiber guide grooves 42A. Thus, side wall faces opposing at the leading ends of the fiber guide grooves 42A with which the optical fibers 3 contact are shaped in a concave form.

In the first embodiment, the width of the adhesive spread groove 44, that is, the width in the extending direction of the fiber guide grooves 42A is set at about 100 µm.

The optical waveguide 4A has a reflective surface 45 at the other end face in the extending direction of the waveguide cores 40. The reflective surface 45 is an inclined surface with an inclination angle of about 45°, and core end faces of the waveguide cores 40 are exposed from the reflective surface 45.

Thus, in the optical waveguide 4A, an incident/exit surface 45a is formed on the lower side opposite the reflective surface 45. Light that substantially perpendicularly enters the incident/exit surface 45a toward the reflective surface 45 is totally reflected by the reflective surface 45 serving as an interface with air so that an optical path of the light is turned about 90°, and then enters the waveguide cores 40. On the other hand, light propagating through the waveguide cores 40 toward the reflective surface 45 is totally reflected by the reflective surface 45 so that the optical path of the light is turned about 90°, and is emitted from the incident/exit surface 45a in a substantially perpendicular direction.

The optical waveguide 4A may have a stress relaxation groove 46 on each of the right and left sides in the direction in which the waveguide cores 40 are arranged in parallel. For example, the stress relaxation groove 46 is formed by an opening having a depth of about 110 μm from the side face of the optical waveguide 4A.

The optical waveguide 4A is mounted on the mount board 5. The mount board 5 is formed of, for example, silicon (Si). An element mount recess 50 is provided in a portion of the mount board 5 where the optical element 2 is mounted, and a space in which the optical element 2 is mounted is provided on the lower side of the incident/exit surface 45a opposite the reflective surface 45 of the optical waveguide 4A that is mounted on the mount board 5.

Thus, the optical element 2 is mounted below the reflective surface 45 of the optical waveguide 4A. When the optical element 2 is a light emitting element, the reflective surface 45 is aligned with a light emitting section of the optical element 2 (not shown). When the optical element 2 is a light receiving element, the reflective surface 45 is aligned with a light receiving section of the optical element 2 (not shown). In this state, the waveguide cores 40 in the optical waveguide 4A are optically coupled to the optical element 2 by the reflective surface 45.

The optical waveguide 4A mounted on the mount board 5 and the optical fibers 3 inserted in the fiber guide grooves 42A of the optical waveguide 4A are fixed and covered together with a fixing cover 6.

The fixing cover 6 is an example of a fixing member, and is formed of, for example, a transparent inorganic material such as glass. In the first embodiment, the fixing cover 6 is rectangularly shaped in accordance with the outer shape of the optical waveguide 4A.

The fixing cover 6 has a size such as to collectively cover the optical fibers 3 inserted in the fiber guide grooves 42A, coupling portions between the optical fibers 3 and the waveguide cores 40 where the leading ends of the optical fibers 3 and the fiber guide grooves 42A contact, and the adjacency of the end of the reflective surface 45 where the optical element 2 and the optical waveguide 4A are coupled.

The fixing cover 6 and the optical fibers 3 are fixed to the optical waveguide 4A with an adhesive 7. The adhesive 7 is spread between the entire lower surface of the fixing cover 6 and an upper surface of the optical waveguide 4A and around the optical fibers 3 inserted in the fiber guide grooves 42A.

The adhesive 7 further spreads between the leading ends of the optical fibers 3 inserted in the fiber guide grooves 42A and the leading ends of the fiber guide grooves 42A from which the end faces of the waveguide cores 40 are exposed.

For this reason, the adhesive 7 has a refractive index close to the refractive index of the cores 30 of the optical fiber 3 and the waveguide cores 40 of the optical waveguide 4A.

When the optical fibers 3 are inserted in the fiber guide grooves 42A, the end faces of the cores 30 of the optical fibers 3 face the end faces of the waveguide cores 40. Since the adhesive 7 having a refractive index close to the refractive index of the cores 30 and the waveguide cores 40 is provided therebetween, coupling loss is reduced at the coupling portions between the optical fibers 3 and the optical waveguide 4A.

In a step of mounting the fixing cover 6 on the optical waveguide 4A with the adhesive 7, a thermosetting adhesive is not used, but, for example, an ultraviolet curable adhesive is used in order to prevent the optical waveguide 4A from being heated. Since the fixing cover 6 transmits ultraviolet rays, when ultraviolet rays are applied after the optical fibers 3 are inserted in the fiber guide grooves 42A of the optical waveguide 4A mounted on the mount board 5, the adhesive 7 between the fixing cover 6 and the optical waveguide 4A can be cured, so that the fixing cover 6 and the optical fibers 3 can be fixed to the optical waveguide 4A.

Example of Production Procedure for Optical Waveguide in First Embodiment

In the optical waveguide 4A according to the first embodiment, the fiber guide grooves 42A are formed by, for example, a photolithographic process.

An example of a production procedure for the optical waveguide 4A having the fiber guide grooves 42A according to the first embodiment will be described below with reference to FIGS. 5 to 9.

Figure 5A:
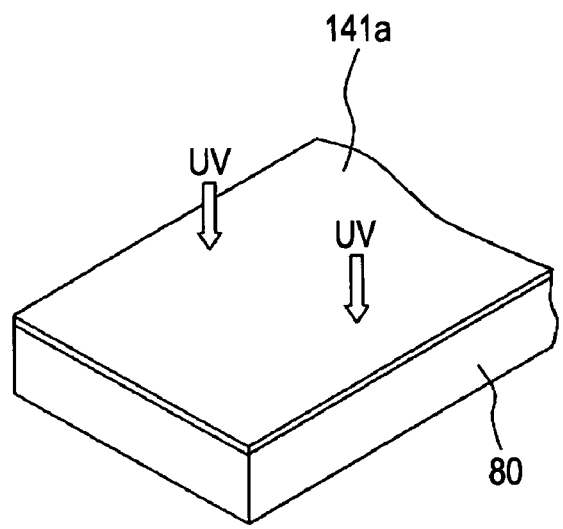
FIGS. 5A and 5B are explanatory views illustrating a production procedure for the optical waveguide of the first embodiment.

First, as shown in FIG. 5A, a buffer-clad-layer forming film 141a having a predetermined thickness is applied on a wafer substrate 80 by using, for example, an ultraviolet curable acrylic polymeric material. In the first embodiment, the buffer-clad-layer forming film 141a is formed of a material that forms the clad 41 shown in FIG. 2.

Next, the buffer-clad-layer forming film 141a is cured by the irradiation of ultraviolet rays UV and is subjected to heat treatment, so that a buffer clad 41a that forms the clad 41 shown in FIG. 2 is formed.

Figure 5B:
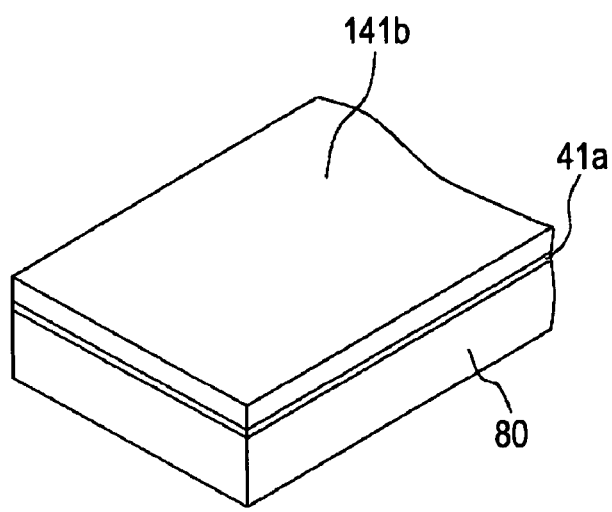

Then, as shown in FIG. 5B, an under-clad-layer forming film 141b having a predetermined thickness is applied on the buffer clad 41a formed on the wafer substrate 80. The under-clad-layer forming film 141b is formed of an ultraviolet curable acrylic polymeric material that forms the clad 41.

Figure 6A:
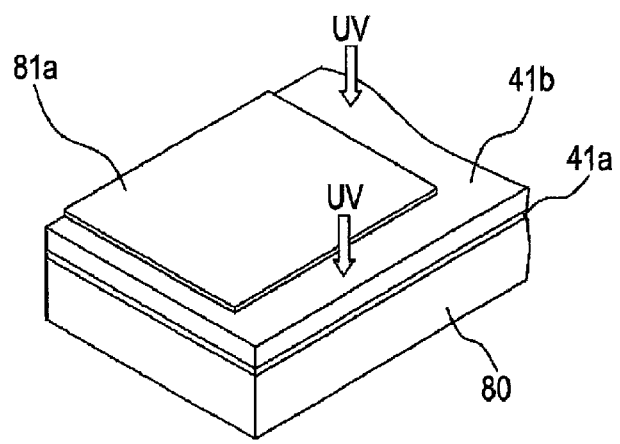
FIGS. 6A and 6B are explanatory views illustrating the production procedure for the optical waveguide.

Subsequently, as shown in FIG. 6A, the under-clad-layer forming film 141b is irradiated with ultraviolet rays UV via a photomask 81 having a pattern that forms an opening corresponding to a fiber-guide-groove forming region 142 where the fiber guide grooves 42A shown in FIG. 3 are to be formed, so that portions of the under-clad-layer forming film 141b other than the fiber-guide-groove forming region 142 are cured.

Figure 6B:
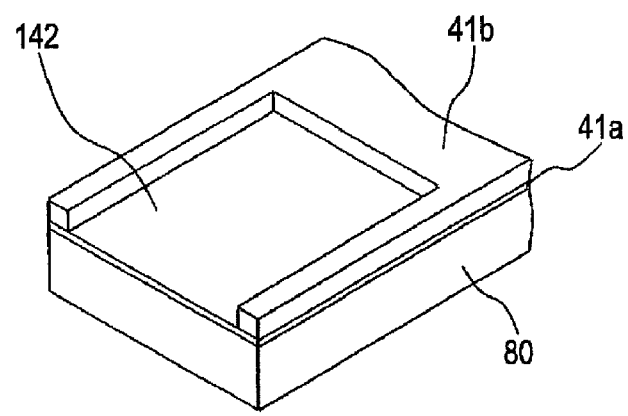

Then, as shown in FIG. 6B, the fiber-guide-groove forming region 142 is removed, for example, by solution development, and heat treatment is performed so as to form an under clad 41b that forms the clad 41. In solution development, for example, TMAH (tetramethyl ammonium hydroxide) is used as a developing agent.

Figure 7A:
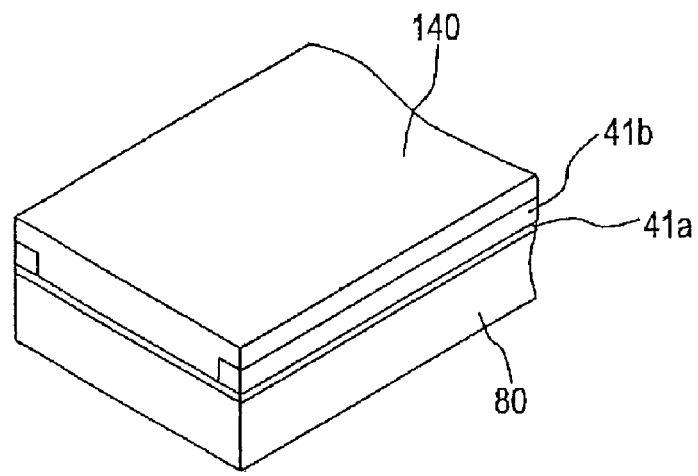
FIGS. 7A and 7B are explanatory views illustrating the production procedure for the optical waveguide.

Next, as shown in FIG. 7A, a core forming film 140 having a predetermined thickness is applied onto the under clad 41b formed on the buffer clad 41a. The core forming film 140 is formed of an ultraviolet curable acrylic polymeric material that forms waveguide cores 40 and side wall portions 43 of the fiber guide grooves 42A.

Figure 7B:
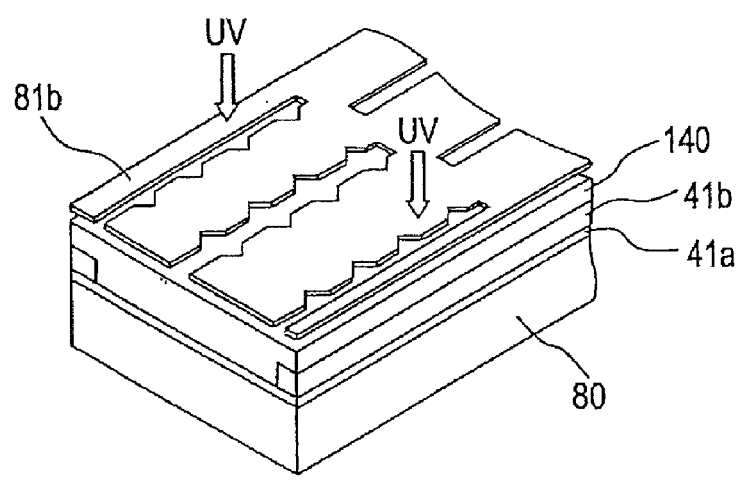

Then, as shown in FIG. 7B, the core forming film 140 is irradiated with ultraviolet rays UV via a photomask 81b having a pattern of the waveguide cores 40 and the side walls 43 of the fiber guide grooves 42A shown in FIG. 3, so that portions of the core forming film 140 that form the waveguide cores 40 and the side walls 43 are cured.

Figure 8A:
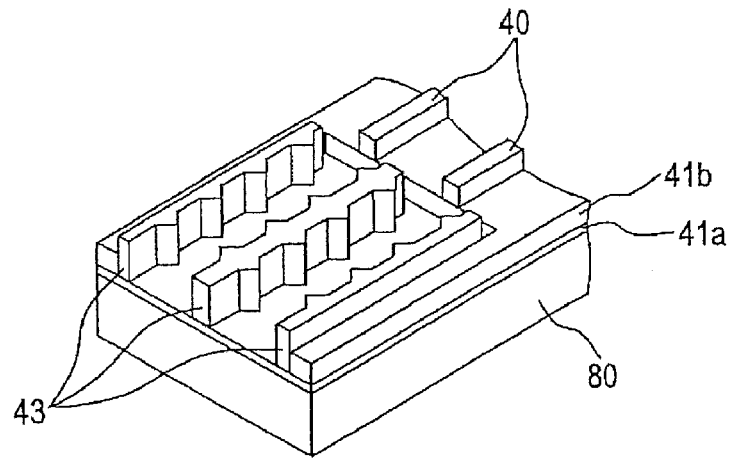
FIGS. 8A and 8B are explanatory views illustrating the production procedure for the optical waveguide.

As shown in FIG. 8A, portions other than the portions that form the waveguide cores 40 and the side walls 43 are removed by solution development, and heat treatment is performed, so that waveguide cores 40 and side wall portions 43 having support projections 43a and adhesive recesses 43b are formed in the pattern shown in FIG. 3.

Figure 8B:
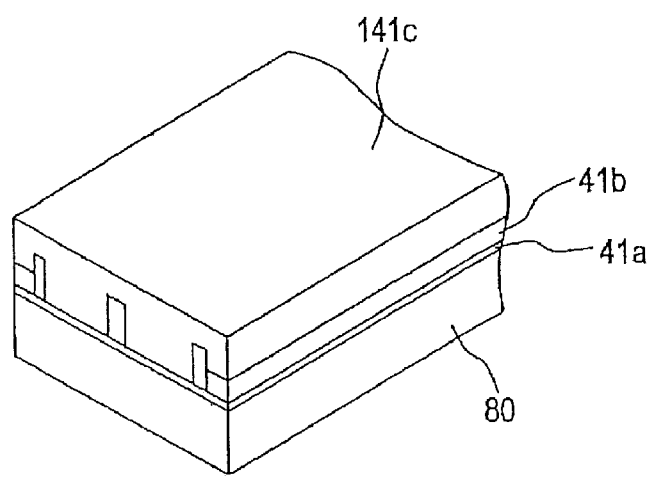

Then, as shown in FIG. 8B, an over-clad-layer forming film 141c having a predetermined thickness is applied onto the under clad 41b formed on the buffer clad 41a, the waveguide cores 40, and the side walls 43 of the fiber guide grooves 42A. The over-clad-layer forming film 141c is formed of an ultraviolet curable acrylic polymeric material that forms the clad 41.

Figure 9A:
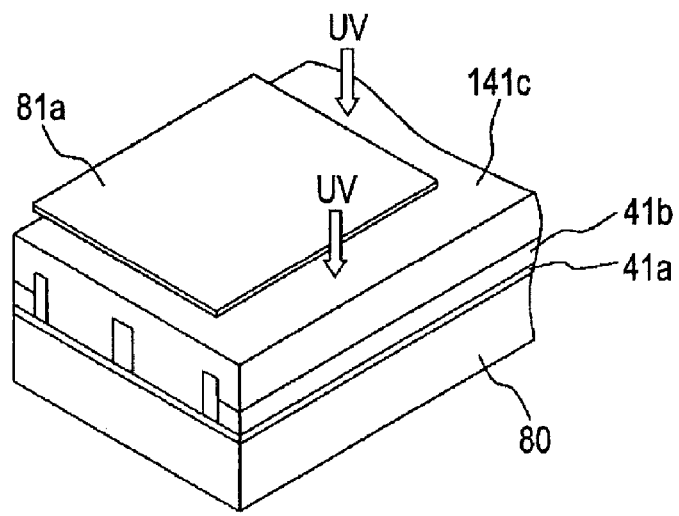
FIGS. 9A and 9B are explanatory views illustrating the production procedure for the optical waveguide.
Figure 9B:
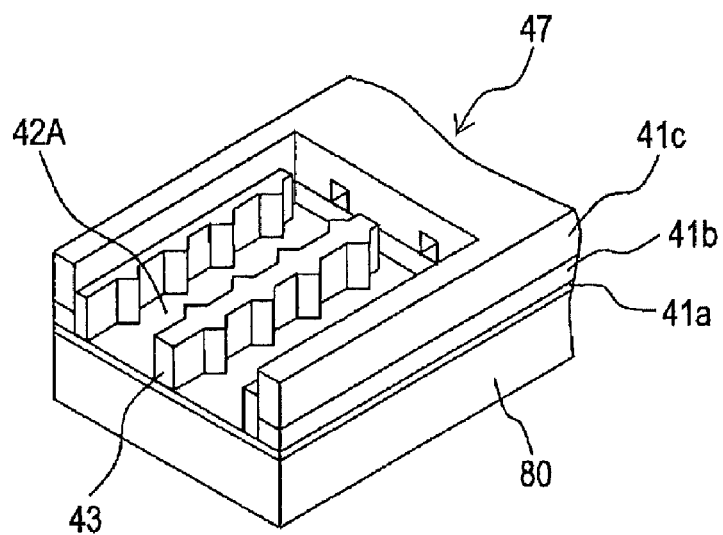

As shown in FIG. 9A, the over-clad-layer forming film 141c is irradiated with ultraviolet rays UV via a photomask 81a having a pattern that forms openings at portions where fiber guide grooves 42A are to be formed, so that portions of the over-clad-layer forming film 141c other than the portions corresponding to the fiber guide grooves 42A are cured. Then, as shown in FIG. 9B, the fiber-guide-groove forming region 142 is removed by solution development, and heat treatment is performed so as to form an over clad 41c.

Through the above-described process, a waveguide sheet 47 in which the waveguide cores 40 and the fiber guide grooves 42A are formed in a predetermined pattern is formed on the wafer substrate 80. When the stress relaxation grooves 46 shown in FIG. 1 are formed, they are formed by the same process as that for the clad 41.

In order to form a reflective surface 45 shown in FIG. 2, the waveguide sheet 47 is cut at a predetermined position with a dicing blade having an edge portion of V-shaped cross section (not shown). An end face of the waveguide sheet 47 is cut at an angle of about 45° across the waveguide cores 40, thus forming a reflective surface 45.

Portions other than the reflective surface 45 are cut with a dicing blade having an edge portion of vertical cross section (not shown). Thus, the end faces of the waveguide sheet 47 are cut at an angle of about 90° at the portions other than the reflective surface 45, and the waveguide sheet 47 is thereby cut as a discrete optical waveguide 4A.

Then, the waveguide sheet 47 cut as the optical waveguide 4A is separated from the wafer substrate 80. Consequently, the produced optical waveguide 4A includes the waveguide cores 40 formed by the photolithographic process, and the fiber guide grooves 42A in which the side walls 43 having the support projections 43a for supporting the optical fibers 3 and the adhesive recesses 43b are formed of the core material by the same production process as that for the waveguide cores 40.

Example of Production Procedure for Optical Module According to First Embodiment A production procedure for the optical module 1A according to the first embodiment will now be described with reference to the drawings.

In order to produce the optical module 1A of the first embodiment, the optical element 2 is mounted on the mount board 5, the optical waveguide 4A is mounted on the mounted board 5 on which the optical element 2 has been mounted, and the optical fibers 3 and the fixing cover 6 are mounted on the optical waveguide 4A that has been mounted on the mount board 5.

An example of a production procedure for the above-described optical module 1A will be described. First, the optical element 2 is mounted at a predetermined position in the element mount recess 50 of the mount board 5 with reference to markers (not shown).

The optical waveguide 4A is placed on the mount board 5 on which the optical element 2 is mounted, in a manner such that the buffer clad 41a faces down. Since the optical waveguide 4A transmits light, for example, markers (not shown) provided on an upper surface of the optical element 2 so as to indicate the reference position are checked from the side of the reflective surface 45 of the optical waveguide 4A by utilizing image recognition, and the reflective surface 45 of the optical waveguide 4A is aligned with a light emitting section (not shown) of the optical element 2 when the optical element 2 is a light emitting element. In contrast, when the optical element 2 is a light receiving element, the reflective surface 45 is aligned with a light receiving section (not shown) of the optical element 2.

Hence, the optical waveguide 4A and the optical element 2 can be aligned by passive alignment while moving the optical waveguide 4A along the surface of the mount board 5 without actually outputting light.

After the optical waveguide 4A is placed on the mount board 5 on which the optical element 2 is mounted, and is aligned with the optical element 2, an ultraviolet curable adhesive is spread between the optical waveguide 4A and the mount board 5, and is cured by being irradiated with ultraviolet rays.

The optical waveguide 4A is thereby fixed to the mount board 5 at a position where the waveguide cores 40 and the optical element 2 are optically coupled by the reflective surface 45.

After the optical waveguide 4A is mounted on the mount board 5, the optical fibers 3 are inserted in the fiber guide grooves 42A of the optical waveguide 4A, and the leading ends of the optical fibers 3 are brought into contact with the leading ends of the fiber guide grooves 42A. Then, the inserted optical fibers 3 are pressed by the fixing cover 6.

In a state in which the optical fibers 3 are inserted in the fiber guide grooves 42A, little space is formed between the outer peripheral surfaces of the optical fibers 3 and the support projections 43a, and this restricts the radial movement of the optical fibers 3.

The depth of the fiber guide grooves 42A is slightly smaller than the diameter of the optical fibers 3. Therefore, when the optical fibers 3 are inserted in the fiber guide grooves 42A and are pressed by the fixing cover 6, the center positions of the cores 30 in the optical fibers 3 are adjusted so that the optical axes of the cores 30 coincide with the optical axes of the waveguide cores 40. This allows the optical waveguide 4A and the optical fibers 3 to be connected by passive alignment with a mechanical positioning accuracy without actually outputting light.

When the ultraviolet curable adhesive 7 is poured between the optical waveguide 4A and the fixing cover 6 that presses the optical fibers 3 inserted in the fiber guide grooves 42A, it spreads between the entire lower surface of the fixing cover 6 and an upper surface of the optical waveguide 4A, around the optical fibers 3 inserted in the fiber guide grooves 42A, and between the leading ends of the optical fibers 3 and the leading ends of the fiber guide grooves 42A from which the end faces of the waveguide cores 40 are exposed.

The adhesive 7 poured from between the fixing cover 6 and the optical waveguide 4A spreads from the periphery of the fixing cover 6 into the fiber guide grooves 42A. Between the adjacent fiber guide grooves 42A, the adhesive 7 flows through the adhesive spread groove 44.

Thus, the adhesive 7 can spread into the fiber guide grooves 42A remote from the pouring position not only through the gap between the fixing cover 6 and the optical waveguide 4A, but also through the adhesive spread groove 44. Therefore, even when the number of fiber guide grooves 42A increases, the adhesive 7 spreads into the fiber guide grooves 42A in a short time.

Further, when the leading ends of the optical fibers 3 inserted in the fiber guide groves 42A are brought into contact with the leading ends of the fiber guide grooves 42A from which the end faces of the waveguide cores 40 are exposed, bubbles in the adhesive 7 are caused to escape into the adhesive spread groove 44 between the fiber guide grooves 42A. This prevents bubbles from entering the adhesive 7 spread between the leading ends of the optical fibers 3 and the leading ends of the fiber guide grooves 42A.

When the adhesive 7 is poured from between the fixing cover 6 and the optical waveguide 4A, it flows through the spaces between the outer peripheral surfaces of the optical fibers 3 inserted in the fiber guide grooves 42A and the adhesive recesses 43b of the fiber guide grooves 42A, and spreads toward bottom faces of the fiber guide grooves 42A.

Then, the adhesive 7 between the fixing cover 6 and the optical waveguide 4A is cured by irradiation of ultraviolet rays. The optical fibers 3 are thereby fixed to the optical waveguide 4A at positions where the cores 30 are optically coupled to the waveguide cores 40 of the optical waveguide 4A. Further, the optical waveguide 4A is fixed to the mount board 5 by being covered with the fixing cover 6.

Since the adhesive spread groove 44 is provided at the leading ends of the fiber guide grooves 42A, as described above, bubbles are prevented from entering the adhesive 7 spread between the leading ends of the optical fibers 3 and the leading ends of the fiber guide grooves 42A. When the adhesive 7 is cured, bubbles do not remain between the end faces of the optical fibers 3 and the end faces of the waveguide cores 40 that face each other at the leading ends of the fiber guide grooves 42A.

In a step of forming rectangular grooves by a photographic process, the corners of the grooves are sometimes rounded in accordance with, for example, the width of the grooves. If the corners at the leading ends of the fiber guide grooves in which optical fibers are to be inserted are round, when the leading ends of the optical fibers are brought into contact with the leading ends of the fiber guide grooves, gaps are formed therebetween.

In contrast, since the width of the leading ends of the fiber guide grooves 42A is increased by the adhesive spread groove 44 in the optical waveguide 4A of the first embodiment, a portion with which the leading ends of the optical fibers 3 contact is formed by a vertical surface. This minimizes formation of gaps when the leading ends of the optical fibers 3 contact with the leading ends of the fiber guide grooves 42A.

Consequently, loss can be reduced at the portions where the optical fibers 3 and the optical waveguide 4 are coupled optically. While the width of the adhesive spread groove 44 is about 100 μm in the first embodiment, it is preferably in the range of about 50 to 150 μm. This is because it is difficult to form the adhesive spread groove 44 by the photolithographic process when the width is less than or equal to 50 μm and the leading ends of the optical fibers 3 are insufficient fixed when the width is more than or equal to 150 μm.

The adhesive 7 spreads not only over the portions of the inserted optical fibers 3 exposed from the upper openings of the fiber guide grooves 42A, but also around the entire outer peripheral surfaces of the optical fibers 3. This increases the adhesive strength.

The side wall portions 43 of the fiber guide grooves 42A having the support projections 43a for supporting the optical fibers 3 and the adhesive recesses 43b are formed by using the same process and with the same mask as those for the waveguide cores 40. Therefore, the side wall portions 43 are formed with the same accuracy as that of the waveguide cores 40.

Thus, the optical fibers 3 inserted in the fiber guide grooves 42A are supported by the support projections 43a, and the center positions of the optical fibers 3 with respect to the waveguide cores 40 of the optical waveguide 4A are adjusted with high accuracy.

In the above-described procedure, the optical module 1A is produced in which the optical element 2 and the optical waveguide 4A are mounted on the mount board 5 and the optical fibers 3 are connected to the optical waveguide 4A.

Structure Example of Optical Waveguide According to Second Embodiment

Figure 10:
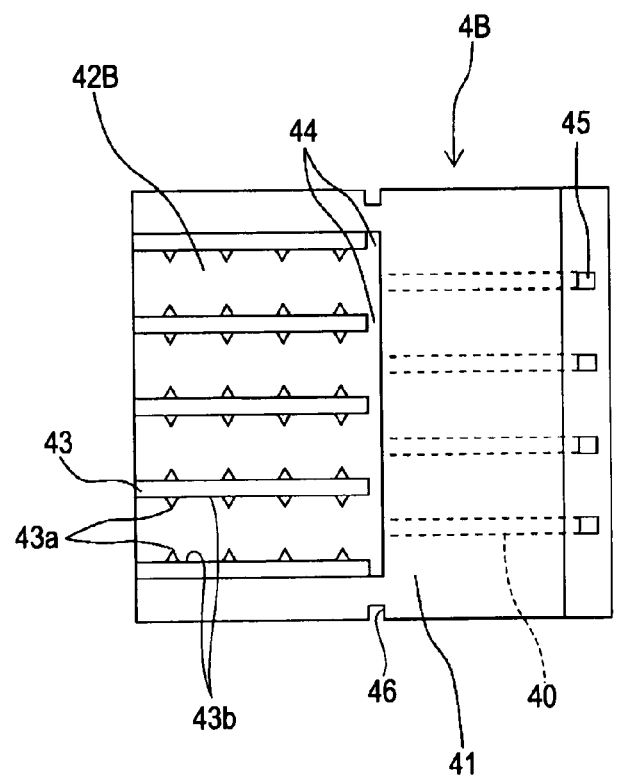
FIG. 10 is a plan view of an optical waveguide according to a second embodiment.
Figure 11:
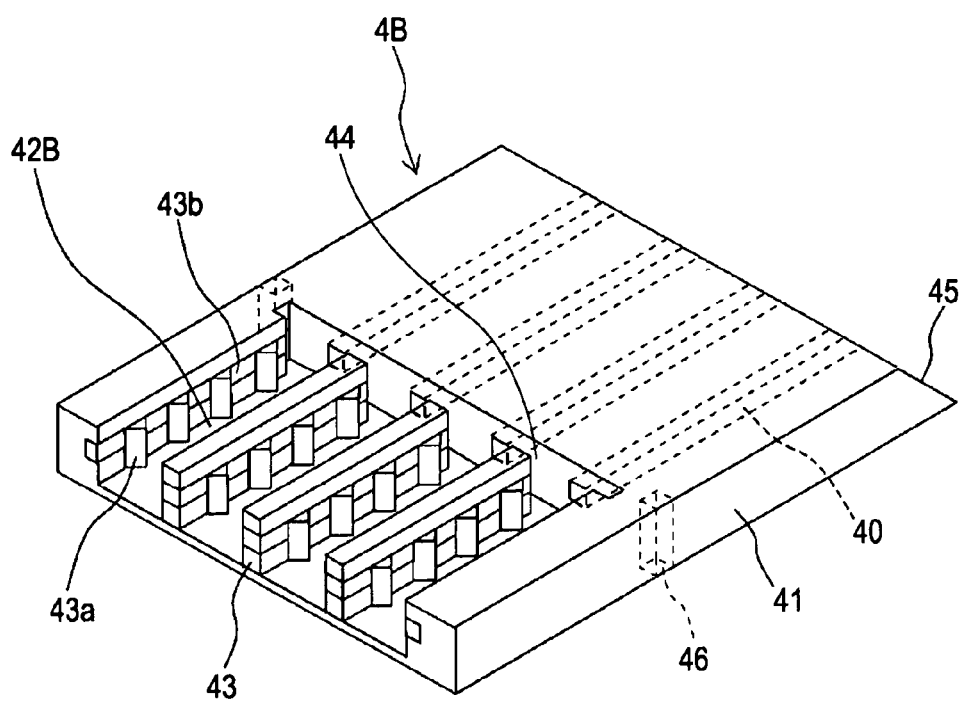
FIG. 11 is a perspective view of the optical waveguide of the second embodiment.

FIG. 10 is a plan view illustrating an optical waveguide according to a second embodiment, and FIG. 11 is a perspective view of the optical waveguide. An optical module including the optical waveguide of the second embodiment can have the same structure as that shown in FIGS. 1 and 2.

An optical waveguide 4B according to the second embodiment has fiber guide grooves 42B at one end face in the extending direction of waveguide cores 40, and a reflective surface 45 at the other end face in that direction. Optical fibers 3 shown in FIG. 1 are inserted in the fiber guide grooves 42B.

Each of the fiber guide grooves 42B includes side wall portions 43 each having support projections 43a and adhesive recesses 43b. The support projections 43a support, align and optically couple an optical fiber 3 to the corresponding waveguide core 40. The adhesive recesses 43b form gaps between the outer peripheral surface of the optical fiber 3 and the fiber guide groove 42B so that an adhesive spreads in the gaps. At the leading ends of the fiber guide grooves 42B, an adhesive spread groove 44 is provided to connect the leading ends of the fiber guide grooves 42B arranged in parallel.

In the optical waveguide 4B of the second embodiment, the support projections 43a of the side wall portions 43 of the fiber guide grooves 42B are formed of a core material that forms the waveguide cores 40, and the adhesive recesses 43b are formed of the core material and a clad material. When the optical waveguide 4B is produced, the support projections 43a of the fiber guide grooves 42B for supporting the optical fibers 3 are formed by the same process and with the same accuracy as those for the waveguide cores 40. The optical waveguide 4B of the second embodiment is produced in a procedure similar to the above-described procedure shown in FIGS. 5 to 9.

Thus, in the optical waveguide 4B of the second embodiment, it is also possible to increase the accuracy in aligning the optical fibers 3 inserted in the fiber guide grooves 42B with the waveguide cores 40. Moreover, the speed of spread of the adhesive into the fiber guide grooves 42B can be increased when the optical fibers 3 are mounted, and bubbles are prevented from entering between the leading ends of the optical fibers 3 and the leading ends of the fiber guide grooves 42B.

Structure Example of Optical Waveguide According to Third Embodiment

Figure 12:
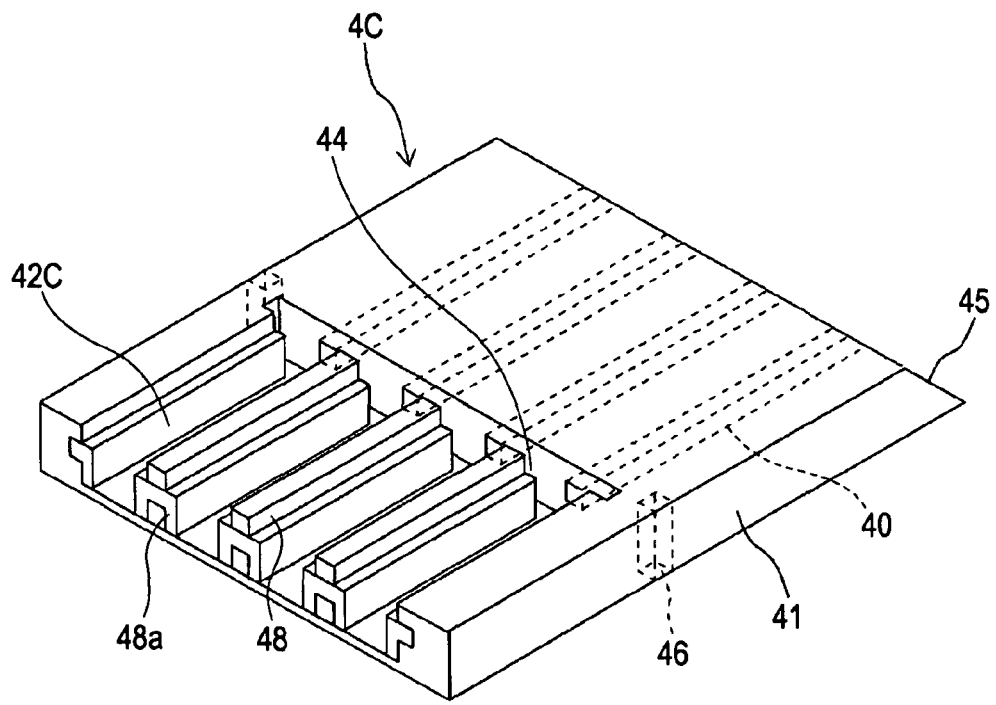
FIG. 12 is a perspective view of an optical waveguide according to a third embodiment.
Figure 13:
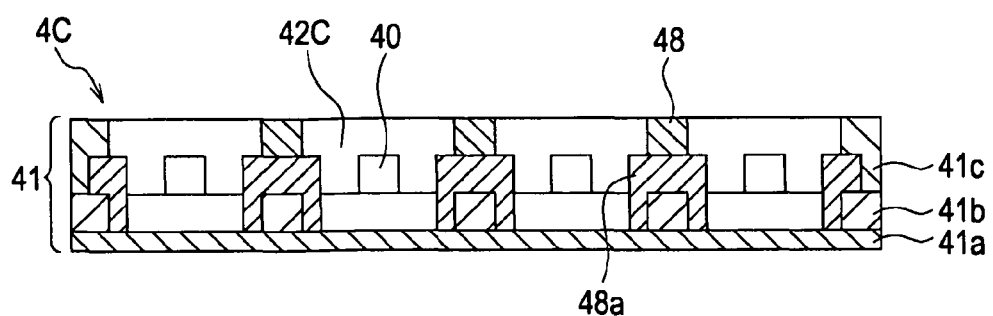
FIG. 13 is a cross-sectional view of the optical waveguide of the third embodiment.

FIG. 12 is a perspective view illustrating an optical waveguide according to a third embodiment, and FIG. 13 is a cross-sectional view of the optical waveguide. An optical module including the optical waveguide of the third embodiment can have the same structure as that shown in FIGS. 1 and 2.

An optical waveguide 4C according to the third embodiment has fiber guide grooves 42C at one end face in the extending direction of waveguide cores 40, and a reflective surface 45 at the other end face in that direction. Optical fibers 3 shown in FIG. 1 are inserted in the fiber guide grooves 42C.

Each of the fiber guide grooves 42C includes side wall portions 48 that support, align, and optically couple an optical fiber 3 to the corresponding waveguide core 40. At the leading ends of the fiber guide grooves 42C, an adhesive spread groove 44 is provided to connect the leading ends of the fiber guide grooves 42C arranged in parallel.

In the optical waveguide 4C of the third embodiment, each of the side wall portions 48 extending straight in the fiber guide grooves 42C is formed of a core material that forms the waveguide core 40 and a clad material that forms a buffer clad 41a, an under clad 41b, and an over clad 41c. In the side wall portions 48, support portions 48a for supporting the optical fibers 3 are formed of the core material. When the optical waveguide 4C is produced, the support portions 48a of the side wall portions 48 of the fiber guide grooves 42C, which support the optical fibers 3, are formed by the same production process and with the same accuracy as those for the waveguide cores 40. The optical waveguide 4C of the third embodiment is produced in a procedure similar to the above-described procedure shown in FIGS. 5 to 9.

Thus, in the optical waveguide 4C of the third embodiment, it is also possible to increase the accuracy in aligning the optical fibers 3 inserted in the fiber guide grooves 42C with the waveguide cores 40. Further, a mask used to form the fiber guide grooves 42C by the photolithographic process can be realized with a simple shape. In addition, since the adhesive spread groove 44 is provided, the speed of spread of the adhesive into the fiber guide grooves 42C can be increased when the optical fibers 3 are mounted, and bubbles are prevented from entering between the leading ends of the optical fibers 3 and the leading ends of the fiber guide grooves 42C.

Structure Example of Optical Waveguide According to Fourth Embodiment

Figure 14:
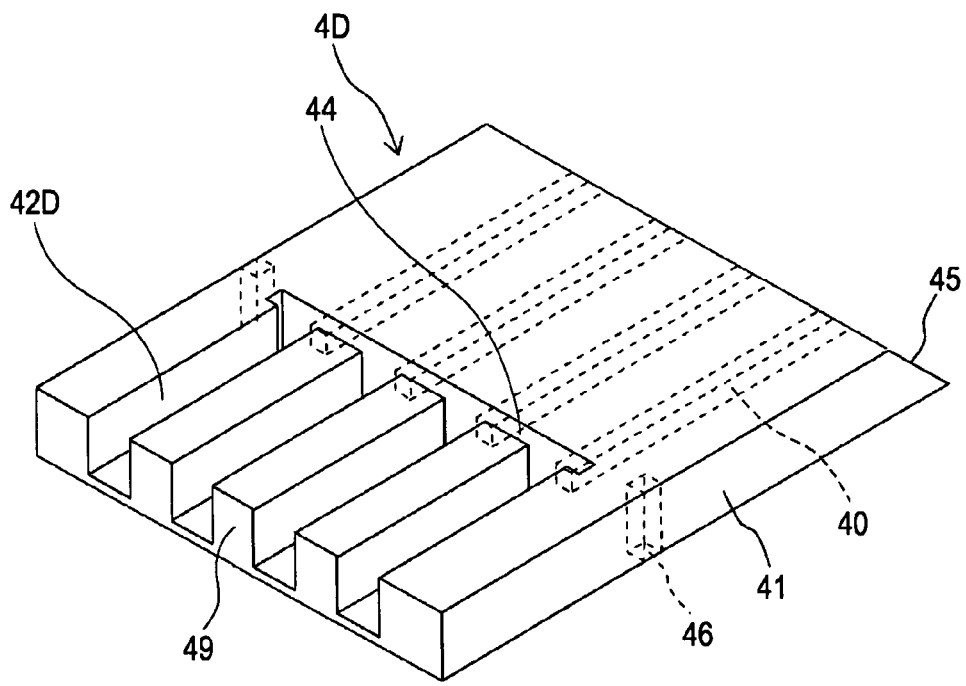
FIG. 14 is a perspective view of an optical waveguide according to a fourth embodiment.
Figure 15:
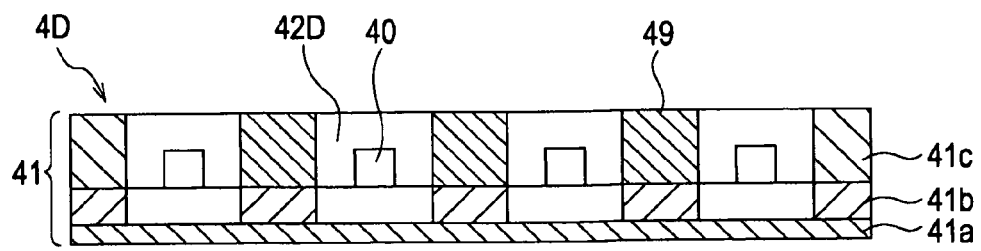
FIG. 15 is a cross-sectional view of the optical waveguide of the fourth embodiment.

FIG. 14 is a perspective view illustrating an optical waveguide according to a fourth embodiment, and FIG. 15 is a cross-sectional view of the optical waveguide. An optical module including the optical waveguide of the fourth embodiment can have the same structure as that shown in FIGS. 1 and 2.

An optical waveguide 4D according to the fourth embodiment has fiber guide grooves 42D at one end face in the extending direction of waveguide cores 40, and a reflective surface 45 at the other end face in that direction. Optical fibers 3 shown in FIG. 1 are inserted in the fiber guide grooves 42D.

Each of the fiber guide grooves 42D includes side wall portions 49 that support, align, and optically couple an optical fiber 3 to the corresponding waveguide core 40. At the leading ends of the fiber guide grooves 42C, an adhesive spread groove 44 is provided to connect the leading ends of the fiber guide grooves 42C arranged in parallel.

In the optical waveguide 4D of the fourth embodiment, the side wall portions 49 extending straight in the fiber guide grooves 42D are formed of a clad material that forms a buffer clad 41a, an under clad 41b, and an over clad 41c.

Thus, in the optical waveguide 4D of the fourth embodiment, a mask used to form the fiber guide grooves 42D by the photolithographic process can be realized with a simple shape. In addition, since the adhesive spread groove 44 is provided, the speed of spread of the adhesive into the fiber guide grooves 42D can be increased when the optical fibers 3 are mounted, and bubbles are prevented from entering between the leading ends of the optical fibers 3 and the leading ends of the fiber guide grooves 42D.

Figure 16:
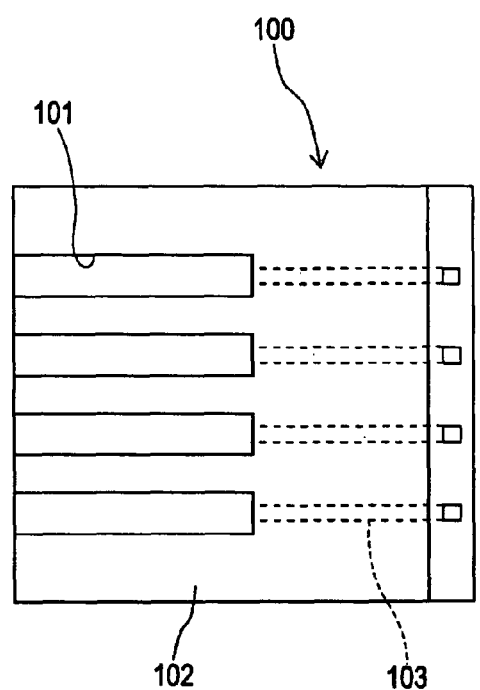
FIG. 16 is a plan view illustrating an optical waveguide as the related art for comparison.

Comparison of Optical Waveguides of the Embodiments With Optical Waveguides as the Related Art FIG. 16 is a plan view illustrating an example of an optical waveguide of the related art for comparison. In an optical waveguide 100 of the related art, fiber guide grooves 101 are formed of a clad material that forms a clad 102, and an adhesive spread groove is not provided in a first comparative example. In a second comparative example, the fiber guide grooves 101 are formed of a core material that forms waveguide cores 103, and an adhesive spread groove is not provided.

In contrast, the optical waveguide 4A shown in FIG. 1 and so on according to the first embodiment was used in a first example, and the optical waveguide 4D shown in FIG. 14 and so on according to the fourth embodiment was used in a second example.

In all of the first and second examples and the first and second comparative examples, optical fibers were inserted into fiber guide grooves and are pressed by a fixing cover, and the leading ends of the optical fibers were brought into contact with the leading ends of the fiber guide grooves. In this state, the way in which an adhesive poured from between the fixing cover and the optical waveguide spread was observed. The observation results are shown in the following Table 1:

TABLE 1

|  | Fiber Guide Groove | Adhesive Spread Groove | Entry of Bubbles | Spread Speed of Adhesive |
| --- | --- | --- | --- | --- |
| First Example | Core Material | Provided | Did Not Enter | High |
| Second Example | Clad Material | Provided | Did Not Enter | High |
| First Comparative Example | Clad Material | Not Provided | Entered | Low |
| Second Comparative Example | Core Material | Not Provided | Entered | Low |

As shown in Table 1, entry of bubbles between the leading ends of the optical fibers and the leading ends of the fiber guide grooves was not found in the optical waveguides (4A, 4D) of the first and second examples. Further, the speed of spread of the adhesive into the fiber guide grooves was high.

In contrast, entry of bubbles between the leading ends of the optical fibers and the leading ends of the fiber guide grooves was found in the optical waveguides of the first and second comparative examples. Further, the speed of spread of the adhesive into the fiber guide grooves was low.

From the above, it was revealed that the time taken to mount the optical fibers could be shortened and the coupling loss with the optical fibers could be reduced in the optical waveguides to which the embodiments of the present invention were applied.

It should be understood by those skilled in the art that various modifications, combinations, sub-combinations and alterations may occur depending on design requirements and other factors insofar as they are within the scope of the appended claims or the equivalents thereof.

What is claimed is:

1. An optical module comprising:
   an optical waveguide including a waveguide core section and fiber guide groove section integrally connected to the waveguide core section, the waveguide core section having a plurality of longitudinally-extending waveguide cores through which light propagates, and a clad configured to trap the light in the waveguide cores, the fiber guide groove section having a fiber guide groove base panel integrally connected to the waveguide core section and a plurality of longitudinally-extending, parallel side walls, the fiber guide groove base panel having a fiber guide groove base panel floor defining a flat plane, the plurality of longitudinally-extending, parallel side walls projecting from the fiber guide groove base panel floor to define a plurality of longitudinally-extending, parallel fiber guide grooves in which optical fibers to be optically coupled to the waveguide cores are inserted and in which respective ones of the plurality of fiber guide grooves longitudinally align and communicate with respective ones of the plurality of waveguide cores; and a fixing member fixed to the optical waveguide with an adhesive while covering the fiber guide grooves in which the optical fibers are inserted, wherein the side walls include support projections integrally connected thereto that project perpendicularly therefrom into the fiber guide grooves, are configured to support and contact the optical fibers inserted in the fiber guide grooves and to align and optically couple the optical fibers to the waveguide cores, wherein each one of the side walls extends from an end of the fiber guide groove section towards the waveguide core section and terminates adjacent yet prior to the waveguide core section to define an adhesive spread groove extending from the fiber guide groove base panel floor and perpendicularly relative to the fiber guide grooves between and along respective terminal ends of the side walls and the waveguide core section in order to communicate with juxtaposed ones of the fiber guide grooves and wherein a plurality of support projections are integrally connected to each one of the side walls and each one of the support projections is triangularly shaped and projects into a respective fiber guide groove while simultaneously tapers from a respective one of the side walls and into the respective fiber guide groove to form a support projection apex that contacts the optical fiber when the optical fiber is inserted into the fiber guide groove.

2. The optical module according to claim 1, wherein the optical waveguide further includes:

a reflective surface from which end faces of the waveguide cores are exposed, the reflective surface being provided on an inclined face at an end face of the optical waveguide opposite the fiber guide grooves, and wherein the optical waveguide is mounted on a substrate in a manner such that an optical element mounted on the substrate is aligned with the reflective surface of the optical waveguide.

3. An optical module comprising:

an optical waveguide including a waveguide core section and fiber guide groove section integrally connected to the waveguide core section at an interface, the waveguide core section having a plurality of waveguide cores through which light propagates, and a clad configured to trap the light in the waveguide cores, the fiber guide groove section having a plurality of parallel-extending side walls defining a plurality of fiber guide grooves in which optical fibers to be optically coupled to the waveguide cores are inserted, the fiber guide grooves being arranged in parallel, and an adhesive spread groove extending in a direction intersecting the fiber guide grooves and configured to connect the fiber guide grooves arranged in parallel, the adhesive spread groove being provided at leading ends of the fiber guide grooves with which the optical fibers contact; and a fixing member fixed to the optical waveguide with an adhesive while covering the fiber guide grooves in which the optical fibers are inserted, wherein the fiber guide grooves have the side walls including support projections configured to support the optical fibers inserted in the fiber guide grooves and to align and optically couple the optical fibers to the waveguide cores, and adhesive recesses configured to define gaps between outer peripheral surfaces of the optical fibers and the fiber guide grooves so that the adhesive spreads in the gaps, wherein the side walls extend from an end of the fiber guide groove section towards the waveguide core section and terminate adjacent yet prior to the interface to define, in part, the adhesive spread groove and wherein at least the support projections of the fiber guide grooves are formed of a core material that forms the waveguide core.

4. The optical module according to claim 3, wherein the optical waveguide is formed of a polymeric material, wherein the waveguide cores, the fiber guide grooves, and the adhesive spread groove are formed in a predetermined pattern by a photolithographic process, and wherein the support projections of the fiber guide grooves are formed when the waveguide cores are formed.

5. An optical module comprising:

an optical waveguide including a waveguide core section and fiber guide groove section integrally connected to the waveguide core section, the waveguide core section having a plurality of longitudinally-extending waveguide cores through which light propagates, and a clad configured to trap the light in the waveguide cores, the fiber guide groove section having a fiber guide groove base panel integrally connected to the waveguide core section and a plurality of longitudinally-extending, parallel side walls, the fiber guide groove base panel having a fiber guide groove base panel floor defining a flat plane, the plurality of longitudinally-extending, parallel side walls projecting from the fiber guide groove base panel floor to define a plurality of longitudinally-extending, parallel fiber guide grooves in which optical fibers to be optically coupled to the waveguide cores are inserted and in which respective ones of the plurality of fiber guide grooves longitudinally align and communicate with respective ones of the plurality of waveguide cores; and a fixing member fixed to the optical waveguide with an adhesive while covering the fiber guide grooves in which the optical fibers are inserted, wherein the fiber guide grooves support the optical fibers by the side walls being formed of a core material that forms the waveguide cores or a clad material, and align and optically couple the optical fibers to the waveguide cores, wherein each one of the plurality of the side walls extends from an end of the fiber guide groove section towards the waveguide core section and terminates adjacent yet prior to the waveguide core section at a terminal end to define an adhesive spread groove extending from the fiber guide groove base panel floor and perpendicularly relative to the fiber guide grooves between and along respective terminal ends of the side walls and the waveguide core section in order to communicate with juxtaposed ones of the fiber guide grooves and wherein a plurality of support projections are integrally connected to each one of the side walls and each one of the support projections is triangularly shaped and projects into a respective fiber guide groove while simultaneously tapers from a respective one of the side walls and into the respective fiber guide groove to form a support projection apex that contacts the optical fiber when the optical fiber is inserted into the fiber guide groove.

6. The optical module according to claim 5,
wherein the optical waveguide further includes:
a reflective surface from which end faces of the waveguide cores are exposed, the reflective surface being provided on an inclined face at an end face of the optical waveguide opposite the fiber guide grooves, and
wherein the optical waveguide is mounted on a substrate in a manner such that an element mounted on the substrate is aligned with the reflective surface of the optical waveguide.

7. The optical module according to claim 5,
wherein the optical waveguide is formed of a polymeric material, and
wherein the waveguide cores, the fiber guide grooves, and the adhesive spread groove are formed in a predetermined pattern by a photolithographic process.

8. An optical waveguide comprising:
a waveguide body including a waveguide core section and fiber guide groove section,
the waveguide core section including:
a plurality of longitudinally-extending waveguide cores through which light propagates; and
a clad configured to trap the light in the waveguide cores;
the fiber guide groove section including:
a fiber guide groove base panel integrally connected to the waveguide core section and having a fiber guide groove base panel floor defining a flat plane; and
a plurality of longitudinally-extending, parallel side walls projecting from the fiber guide groove base panel floor to define a plurality of longitudinally-extending, parallel fiber guide grooves in which optical fibers to be optically coupled to the waveguide cores are inserted and in which respective ones of the plurality of fiber guide grooves longitudinally align and communicate with respective ones of the plurality of waveguide cores,
wherein the fiber guide grooves support the optical fibers by the side walls being formed of a core material that forms the waveguide cores or a clad material, and align and optically couples the optical fibers to the waveguide cores
wherein each one of the plurality of the side walls extends from an end of the fiber guide groove section towards the waveguide core section and terminates at a terminal end adjacent yet prior to the waveguide core section to define an adhesive spread groove extending from the fiber guide groove base panel floor and perpendicularly relative to the fiber guide grooves between and along respective terminal ends of the side walls and the waveguide core section in order to communicate with juxtaposed ones of the fiber guide grooves and
wherein a plurality of support projections are integrally connected to each one of the side walls and each one of the support projections is triangularly shaped and projects into a respective fiber guide groove while simultaneously tapers from a respective one of the side walls and into the respective fiber guide groove to form a support projection apex that contacts the optical fiber when the optical fiber is inserted into the fiber guide groove.

9. The optical waveguide according to claim 8, wherein the fiber guide grooves have side walls including support projections configured to support the optical fibers inserted in the fiber guide grooves and to align and optically couple the optical fibers to the waveguide cores, and adhesive recesses configured to define gaps between outer peripheral surfaces of the optical fibers and the fiber guide grooves so that an adhesive spreads in the gaps.

10. The optical waveguide according to claim 8, further comprising:
a reflective surface from which end faces of the waveguide cores are exposed, the reflective surface being provided on an inclined face at an end face of the optical waveguide opposite the fiber guide grooves.

11. The optical waveguide according to claim 8,
wherein the optical waveguide is formed of a polymeric material, and
wherein the waveguide cores, the fiber guide grooves, and the adhesive spread groove are formed in a predetermined pattern by a photolithographic process.

* * * * *